US007548665B2

(12) United States Patent
Tredoux

(10) Patent No.: US 7,548,665 B2
(45) Date of Patent: Jun. 16, 2009

(54) METHOD, SYSTEMS, AND MEDIA FOR IDENTIFYING WHETHER A MACHINE READABLE MARK MAY CONTAIN SENSITIVE DATA

(75) Inventor: Gavan L. Tredoux, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 628 days.

(21) Appl. No.: 11/315,117

(22) Filed: Dec. 23, 2005

(65) Prior Publication Data
US 2007/0177823 A1    Aug. 2, 2007

(51) Int. Cl.
*G06K 9/60* (2006.01)
*H04L 9/32* (2006.01)
(52) U.S. Cl. .................... 382/306; 713/176
(58) Field of Classification Search ........... 382/100, 382/232, 306, 305; 713/170, 176; 705/40; 380/277; 340/5.53; 235/494
See application file for complete search history.

(56) References Cited

U.S. PATENT DOCUMENTS

| 6,676,023 | B2 * | 1/2004 | Shinoda ................... 235/492 |
| 6,970,847 | B1 * | 11/2005 | Melen et al. .............. 705/51 |
| 7,043,052 | B2 * | 5/2006 | Rhoads .................... 382/100 |
| 7,340,607 | B2 * | 3/2008 | Abhyankar et al. ......... 713/176 |
| 2002/0129255 | A1 * | 9/2002 | Tsuchiyama et al. ....... 713/176 |
| 2003/0117262 | A1 * | 6/2003 | Anderegg et al. .......... 340/5.53 |
| 2006/0117182 | A1 * | 6/2006 | Wolff ....................... 713/176 |
| 2006/0210138 | A1 * | 9/2006 | Hilton et al. .............. 382/137 |
| 2006/0271787 | A1 | 11/2006 | DeYoung et al. |
| 2007/0088953 | A1 * | 4/2007 | Hilton et al. .............. 713/176 |

\* cited by examiner

*Primary Examiner*—Kanji Patel
(74) *Attorney, Agent, or Firm*—MH2 Technology Law Group LLP

(57) ABSTRACT

Embodiments of the present invention relate to attesting a document that contains encoded data, such as a barcode or DataGlyph. When a document contains encoded data that is not in human-readable form, the document is checked to determine whether content in the encoded data appears somewhere in the document in human-readable form. Based on the amount of content that appears in the document, the document may be marked with a seal that attests to the amount of content in the encoded data that appears in human-readable form. The seal may be visually distinctive to facilitate easy recognition by a user or device.

19 Claims, 5 Drawing Sheets

METHOD, SYSTEMS, AND MEDIA FOR IDENTIFYING WHETHER A MACHINE READABLE MARK MAY CONTAIN SENSITIVE DATA

FIELD

Embodiments of the present invention relate generally to document identification. In particular, embodiments of the present invention relate to attesting whether a document contains information that may be hidden in encoded data.

BACKGROUND

Printed documents or labels may contain digital data encoded on them using schemes such as two-dimensional barcodes, DataGlyphs, or similar machine readable marks. Data encoded in such marks do not appear in human-readable form, and thus, cannot be easily inspected or read by a user. Typically, such machine readable marks cannot be read by a user without the aid of a machine, such as a data scanner and computer.

A user may be concerned about inclusion of private or confidential data in the document, especially data contained in the machine readable marks. For example, machine readable marks are capable of encoding sensitive information, such as social security numbers, account numbers, addresses, and the like. The user may want to base a decision about the use and disposal of documents or labels on full knowledge of all data contained in the document. For example, a user may wish to securely store or destroy a document or label containing private or confidential data once it has been used.

If the document contains a machine readable marks, the user cannot easily determine if the representations encode private or confidential data. The user must decode the data in the machine readable mark in order to determine its contents. However, some or all of data encoded in the marks may simply be an alternate from of data that is clearly visible in readable printed form. That is, the machine readable marks may only be intended to aid machine processing.

Since the machine readable marks may contain sensitive data, the user cannot make an accurate decision about use and disposal of documents or label that contain machine readable marks without first using a machine to read marks. This may be time consuming if the user has many documents or the document includes several marks. Decoding each mark would be unnecessary if the marks contain only public data or data that is clearly visible in readable printed form elsewhere on the document.

Accordingly, it may be desirable to provide methods and systems that allow a user or device to easily recognize whether or not data encoded in machine readable marks appear in human-readable form somewhere on the document.

SUMMARY

Embodiments of the invention concern a method of producing an attested document. The method includes reading encoded data in a document that is in a form other than human-readable form, determining an amount of content in the encoded data that appears in human-readable form in the document, and determining a seal that attests to the amount of content in the encoded data that appears in human-readable form. The method also includes marking the document with the seal.

Embodiments of the invention also concern another method of verifying a document. The document contains encoded data that is in a form other than human-readable form. The method includes identifying a seal on the document, the seal comprising data about the encoded data on the document. The method also includes reading the seal, determining a digital signature based on the document, and verifying that content in the encoded data appears in human-readable form on the document based on a comparison of the digital signature with the seal.

Embodiments of the invention also concern a system configured to produce attested documents. The system includes at least one processor configured to read encoded data in a document that is in a form other than human-readable form, determine an amount of content in the encoded data that appears in human-readable form in the document, and determine a seal that attests to the amount of content in the encoded data that appears in human-readable form. The system also includes at least one printer that is configured to mark the document with the seal.

Additional embodiments of the invention will be set forth in part in the description which follows, and in part will be obvious from the description, or may be learned by practice of the invention. The embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, several embodiments of the invention and together with the description, serve to explain the principles of the invention.

DETAILED DESCRIPTION

Figure 1:
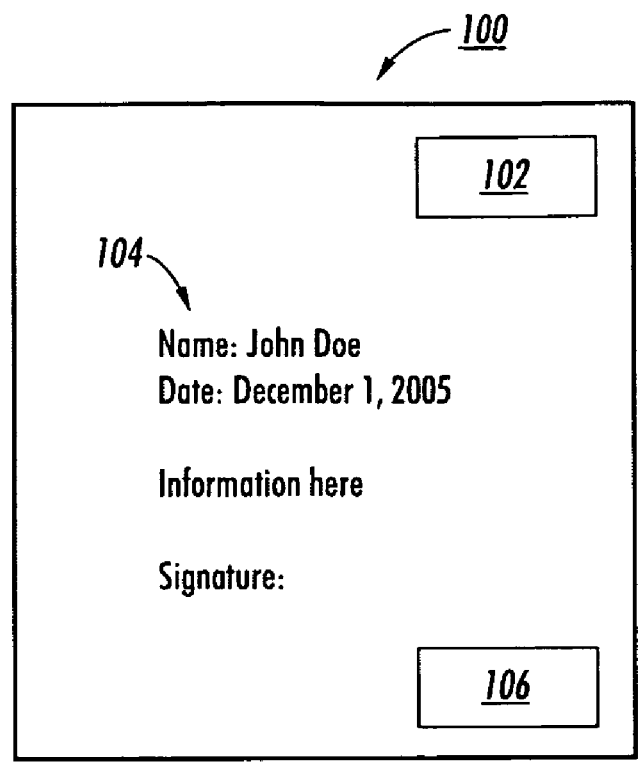
FIG. 1 is a diagram illustrating a document including a seal consistent with embodiments.

Embodiments of the invention provide systems, methods, and media for clearly identifying whether data encoded in a machine readable mark (and not in human-readable form) may contain sensitive data. The systems, methods, and media allow a user to determine whether a document contains data encoded in a machine readable mark that is not visible in ordinary human readable form.

According to various embodiments, a visible seal or similar mark is affixed to a document, label, or other printed item. The visible seal attests that some or all data encoded in machine readable marks is visible in human-readable form elsewhere in the document.

The user may use the visible seal as a basis for making decision about the use and disposition of documents, labels, and printed items, which may contain information considered sensitive by the consumer. The user may use the seal on the documents to insure that all data included in the document is visible, in other words, "what you see is what you get." Accordingly, a system or the user may use classify the document as, "store in a safe location" "destroy" or "treat normally." The system or user may then handle the documents accordingly.

For example, if the document contains only information in human readable form, the document may be recycled. If the document contains information encoded in the machine readable mark not included in the human readable text, the user may destroy the document upon disposal.

To determine if the seal is valid, the user may verify the seal through authentication data contained in the seal. When the seal is verified, the authentication data attests that the origin of the seal is valid. In other words, the seal was produced by the correct and trusted creator. Because the creator is valid, a user may trust that the information in the seal is correct and trustworthy, i.e. that there is no sensitive data in non-human readable form.

The authentication data in the seal may be a digital signature which allows the seal and the document to be verified. The digital signature may be created by signing, using the creators private key, any data which can be compared with the signed data. The verification and trust are established by checking that the digital signature matches the data which was originally signed. Any data may be signed to create the digital signature, so long as the originally signed data is available to compare against the signature. For example, the seal may include a digital signature of both data encoded in the machine readable mark carried by the document and the data used to produce the document. The user may use the digital signature to verify, on demand that the seal is accurate by confirming that the signature corresponds to the data encoded on the document.

In addition to the authentication data contained in the seal, a user may verify the creator of the document and seal by comparing the machine readable mark with the human readable information to verify that no sensitive data is contained in the machine readable mark. The human readable text may be converted to machine readable data and compared with the data encoded in the machine readable mark. The user may receive a level of confidence that information encoded in the machine readable mark is a subset of human readable information.

The seal may be utilized by a wide variety of individuals and organizations. Organization can use the visible seal to assure users that documents from that organization are what they appear to be visually. The seal would serve as a self-check within the document production process that non-visible information encoded in machine readable marks has not been inadvertently included on the document. For example, a pharmacist may attest and at the same time verify, that a label printed on prescription containers do not contain non-visible information sensitive or secret consumer information. Thereby, the pharmacist complies with acts such as laws and assures both the consumer and the company at the same time.

Reference will now be made in detail to exemplary embodiments of the invention, examples of which are illustrated in the accompanying drawings. Wherever possible, the same reference numbers will be used throughout the drawings to refer to the same or like parts.

FIG. 1 illustrates an exemplary document 100 containing a data encoded in a machine readable mark 102 and other information 104. Document 100 may be any type of document that has a machine readable mark, such as medical records, financial records, prescription forms, invoices, or other documents. Machine readable mark 102 may be any type of mark containing digital data which may be read by a machine. The machine readable mark may be any mark such as a DataGlyph, bar code, watermark, or the any other type of machine readable mark.

For example, machine readable mark 102 may be a DataGlyph. In a DataGlyph, digital information in the form of binary 1's and 0's are rendered in the form of very small linear marks. Generally, each small mark represents a digit of binary data; whether the particular digit is a digital 1 or 0 depends on the linear orientation of the particular mark. For example, marks which are oriented from top left to bottom right may represent a 0, while marks oriented from bottom left to top right may represent a 1. The individual marks are of such a size relative to the maximum resolution of a printing device so that, when a large number of such marks are printed together on paper, the overall visual effect to a casual observer is of a mere gray halftone area.

Another example of a machine readable mark may be a barcode. A barcode is a code consisting of a group of patterned bars and spaces and sometimes numerals. The barcode may be scanned and read into computer as identification for the object it labels. Each of the digits zero through nine is represented by a different pattern of bars. One skilled in the art will realize that the machine readable mark is not limited to the above examples.

Document 100 also includes a seal 106 for identifying whether a machine readable mark 102 may contain sensitive data. Seal 106 may be affixed to document 100 in any manner that would maintain seal 106 on document 100 reliably. For example, seal 106 may be printed on document 100, such as in the form of text, a graphic, or a watermark. Additionally, seal 106 may be on a label that is attached to document 100. In such as case, seal 106 may be attached to document 100 by adhesive, staple, clip, or the like.

In some embodiments, seal 106 attests that all data encoded in machine readable mark 102 is visible elsewhere in document 100. In other words, seal 106 indicates that all data that is not human readable on the item appears elsewhere in the document in human readable form. A user may use seal 106 as a basis for making decision about the use and disposition of document 100. For example, if seal 106 indicates that machine readable mark 102 contains data not included elsewhere in document 100, a user may classify, store, or dispose of document 100 in a secure manner.

Additionally, seal 106 may serve as a self-check within the document production process that non-visible information encoded in machine readable mark 102 has not been inadvertently included on document 100. For example, a pharmacist may attest and at the same time verify, that label printed on prescription containers do not contain non-visible information sensitive or secret consumer information.

Seal 106 may have any visual appearance capable of identifying whether sensitive data is encoded in machine readable mark 102. Seal 106 may be arranged in a visually distinctive and recognizable form to facilitate easy recognition by users. The visual appearance of seal 106 may depend on the system used for encoding machine readable mark 102. Also, the visual appearance of seal 106 may depend on the system used to attach seal 106 to document 100. Also, the visual appearance of seal 106 may depend on the system used to create document 100. Once skilled in the art will realize that seal 106 may be in any form or visual appearance to achieve its intended function.

Seal 106 may be affixed to document 100 by the organization or manufacturer responsible for the document system used to create document 100. In such a case, the organization may use seal 106 to assure users that document 100 from that organization is what they appear to be visually. Seal 106 may also be affixed to document 100 by user other than the creator of document 100.

Seal 106 may also provide additional assurance that the seal corresponds to the document concerned by including authentication data. Seal 106 may include authentication data for data encoded in machine readable mark 102. Seal 106 may include authentication data for information 104. The authentication data of seal 106 may be used to verify that seal 106, itself, is authentic and corresponds to document 100.

For example, seal 106 may include a digital signature. Seal 106 may verify itself by confirming that the digital signature corresponds to all or a portion of information 102. Seal 106 may verify itself by confirming that the digital signature corresponds to all or a portion of data encoded in machine readable mark 102 is a subset of the visible data (with the exception of seal 106 itself). Any type of system may be used for verifying the digital signature such as a certification authority and a chain of trust relationship.

Figure 2:
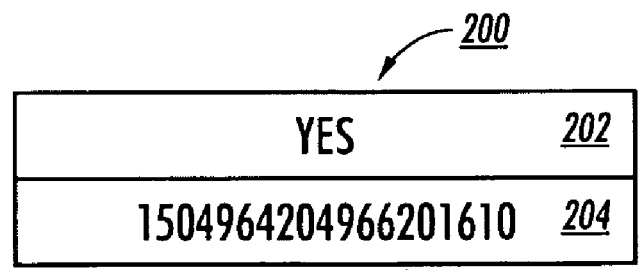
FIG. 2 is a diagram illustrating a seal consistent with embodiments.

FIG. 2 is a diagram illustrating one example of seal 200 which may be used as seal 106 in FIG. 1. One skilled in the art will realize that seal 200 is exemplary and that seal 106 may be in any form or visual appearance to achieve its intended function. As shown in FIG. 2, seal 200 includes data 202 for identifying whether a machine readable mark 102 may contain sensitive data. In this example, data 202 is the English language word "YES." In this case, data 202 would indicate that all data encoded in machine readable mark 102 is contained in human readable information 104. As such, a user may classify document 100 as containing only information clearly readable.

Alternatively, data 202 may be the English language word "No." In this case, data 202 would indicate that data encoded in machine readable mark 102 is not contained in human readable information 104. As such, a user may classify document 100 as containing information not clearly readable. The user may wish to classify document 100 as sensitive since machine readable mark 102 contains data not in clear readable text on document 100.

One skilled in the art will realize that data 202 is not limited to the English language words "Yes" and "No". One skilled in the art will also realize that data 202 is not limited to text data. Data 202 may be any type of human readable data, such as symbols or marks, to identify whether machine readable mark 102 is encoded with data found elsewhere in document 100 in readable form.

Seal 200 also includes authentication data 204. The user may verify the seal through authentication data 204 contained in the seal. When authentication data 204 is verified, the verified authentication data attests that the origin of the seal is valid. In other words, the seal was produced by the correct and trusted creator. Because the creator is trusted, a user may trust that the information in the seal is correct and trustworthy, i.e. that there is no sensitive data in non-human readable form. Authentication data 204 may be, for example, a digital signature. One skilled in the are will realize that authentication data 204 may be any type of data to authenticate seal 200 as being valid, such as a secure hash or watermark.

If a digital signature is used, the signature may be created using any standard type of digital signature scheme. For example, the digital signature may be created using an asymmetric cryptographic scheme such as the Digital Signature Algorithm ("DSA") scheme. The DSA digital signature is a pair of large numbers represented in a computer as strings of binary digits. The digital signature is computed using the Digital Signature Algorithm. Signature generation makes use of a private key to generate a digital signature. Signature verification makes use of a public key which corresponds to, but is not the same as, the private key.

In the DSA scheme, a creator possesses a private and public key pair. Public keys are assumed to be known to the public in general. Private keys are never shared. The digital signature may be created by signing, using the private key, any data which can be compared with the signed data. Anyone can verify the digital signature of a user by employing that creator's public key. The trust is established by checking that the digital signature matches the data which was originally signed.

A hash function is used in the signature generation process transform data to obtain a condensed version of data, called a digest. Any data may be hashed to create the digital signature, so long as the originally signed data is available to compare against the signature. The hash function may be a standard hash function such as the Secure Hash Standard ("SHS") or FIPS 180. For example, either all or a portion of machine readable mark 102 or all or a portion of information 104 or combinations of both may be used as the data to create a digest. The digest is then input to the DSA with the private key to generate the digital signature.

The digital signature is sent to the intended verifier along with document 100. The user of document 100 verifies the signature by using the sender's public key to decrypt the signature. The same hash function is be used in the verification process to recreate the digest. The decrypted signature is then compared to the recreated message digest.

Figure 3:
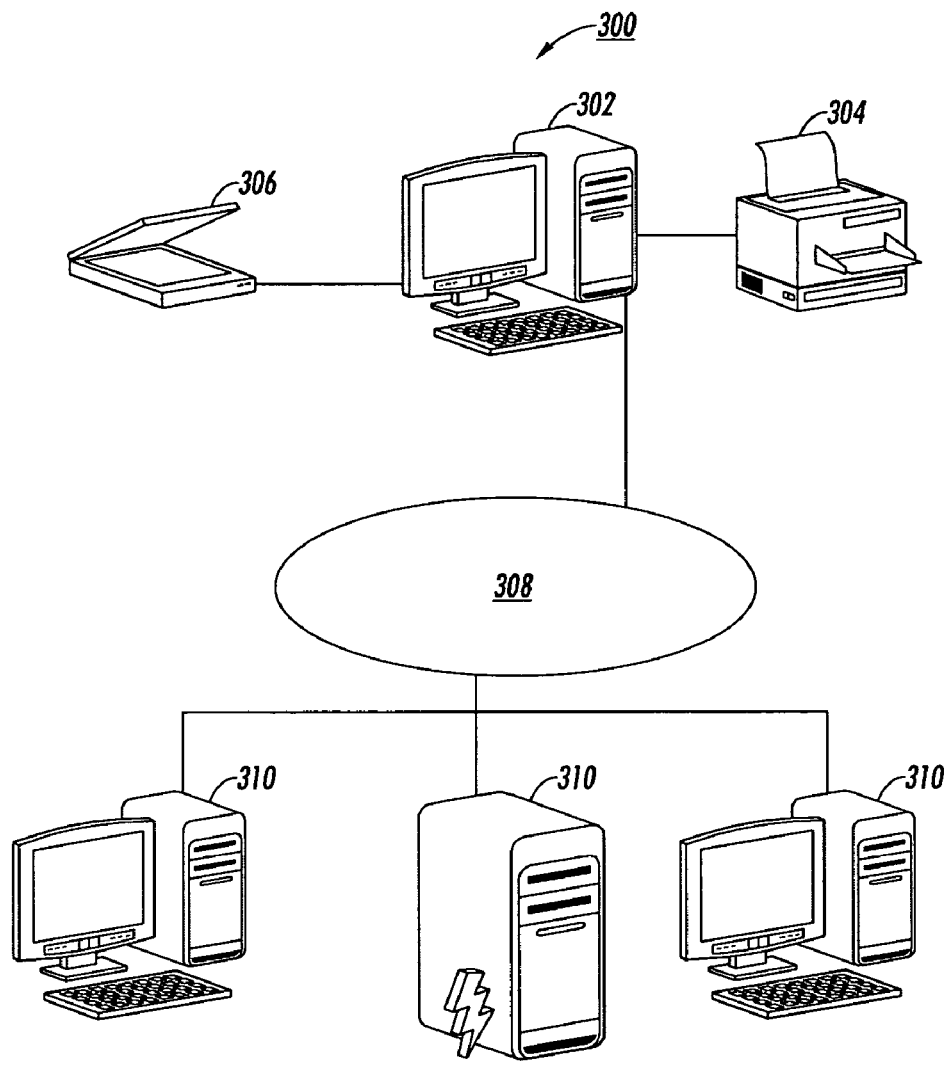
FIG. 3 is a diagram illustrating a system consistent with embodiments.

FIG. 3 is a diagram illustrating a system 300 for creating and using seal 106. System 300 may also be used to create document 100 with machine readable mark 102 and information 104. System 300 may also be used to read machine readable mark 102.

System 300 includes a computer 302. Computer 302 includes the standard components of a computing device. For example, computer 302 may include a processor, memory, buses, video hardware, sound hardware, and input/output ("I/O") ports. The processor may be, for example, a central processing unit (CPU), a micro-controller unit (MCU), digital signal processor (DSP), or the like.

The memory may be a read only memory (ROM), a random access memory (RAM), or a memory with other access options. The memory may be physically implemented by computer-readable media, such as, for example; magnetic media, such as a hard disk, a floppy disk, or other magnetic disk, a tape, a cassette tape; optical media, such as optical disk (CD-ROM, DVD); semiconductor media, such as DRAM, SRAM, EPROM, EEPROM, or memory stick. Further, portions of the memory may be removable or non-removable.

The memory may store and support modules, for example, a basic input output system (BIOS), an operating system (OS), a program library, a compiler, an interpreter, a text-processing tool, and other programs such as database, word-processor, web-browser, and voice-recognition.

Computer 302 may also include a display screen such as a liquid crystal display, plasma display, or cathode ray tube display. Computer 302 may include input/output devices such as a keyboard, mouse, microphone, and speakers. Computer 302 may also include network hardware such as a network interface card for connecting with network 308.

System 300 also includes a printer 304 coupled to computer 302. Printer 304 may be any standard printer such as an inkjet, laser, plotter, or dot matrix printer. Printer 304 may be coupled to computer through any I/O ports included in computer 302. Printer 304 may also be coupled to computer 302 via network 308. Printer 304 may be used to create a document, machine readable mark, seal, or combinations thereof.

System 300 also includes an input device 306 coupled to computer 302. Input device 306 may be any device for reading data into computer 306 from a document, machine readable mark, seal, or combinations thereof. For example, input device 306 may be a laser scanner, an image scanner, a radio frequency scanner, or a magnetic reader. Input device 306 may be coupled to computer through any I/O ports included in computer 302. Input device 306 may also be coupled to computer 302 via network 308.

System 300 may also be coupled to other computers 310 via network 308. Network 308 may be any type of network such as an internet, the Internet, a wide area network, or a local area network. Computers 310 may be contain the same components as computer 302. Computers 310 may also be coupled to printers and input devices such as printer 304 and input device 306. Any of computers 310 may also be a server computer.

Figure 4:
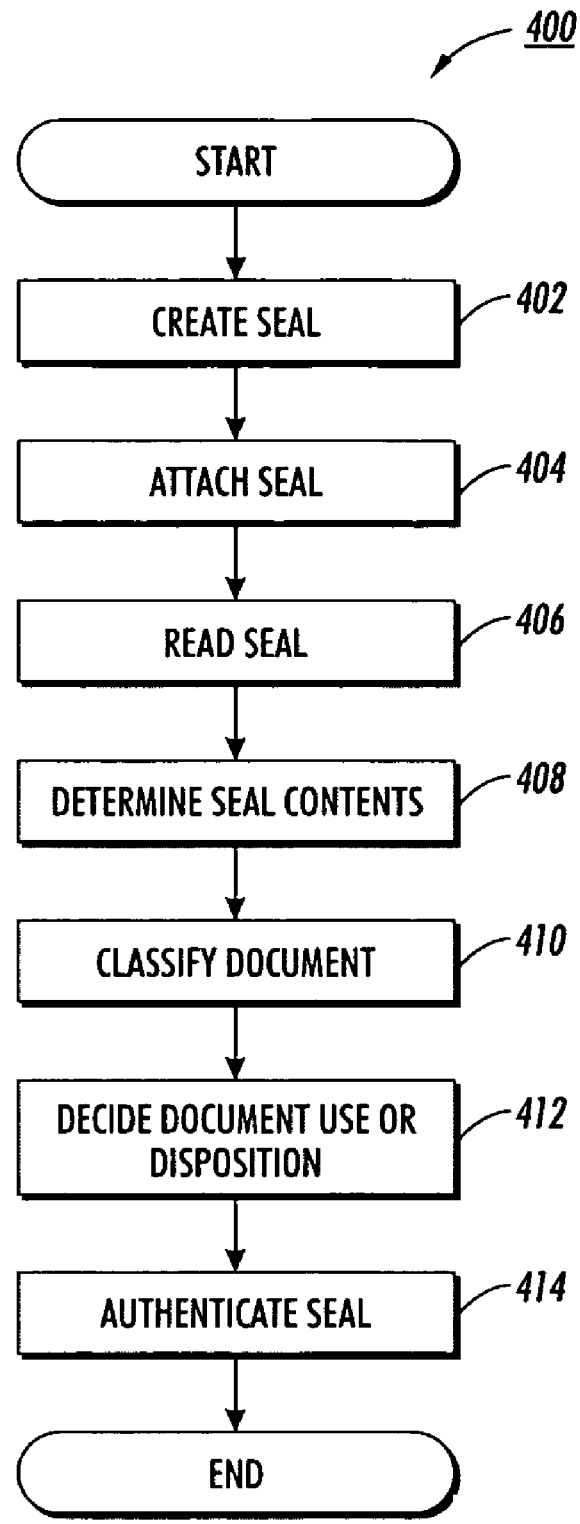
FIG. 4 is a flowchart illustrating a method for identifying whether a machine readable mark consistent with embodiments.

FIG. 4 illustrates a method 400 of using a seal to for clearly identifying whether a machine readable representation may contain sensitive data. For example, method 400 may be used on system 300 to verify document 100.

Method 400 begins by creating seal 106 for document 100 (stage 402). Seal 106 would be created by examining data encoded in machine readable mark 102 to determine if the encoded data is also included in information 102 in human readable form. Data would be added into seal 106 to identify whether data encoded in machine readable mark 102 is also included in information 102 in human readable form. For example, if seal 200 was being utilized, an English language text "Yes" or "No" would be included in data 202.

Figure 5:
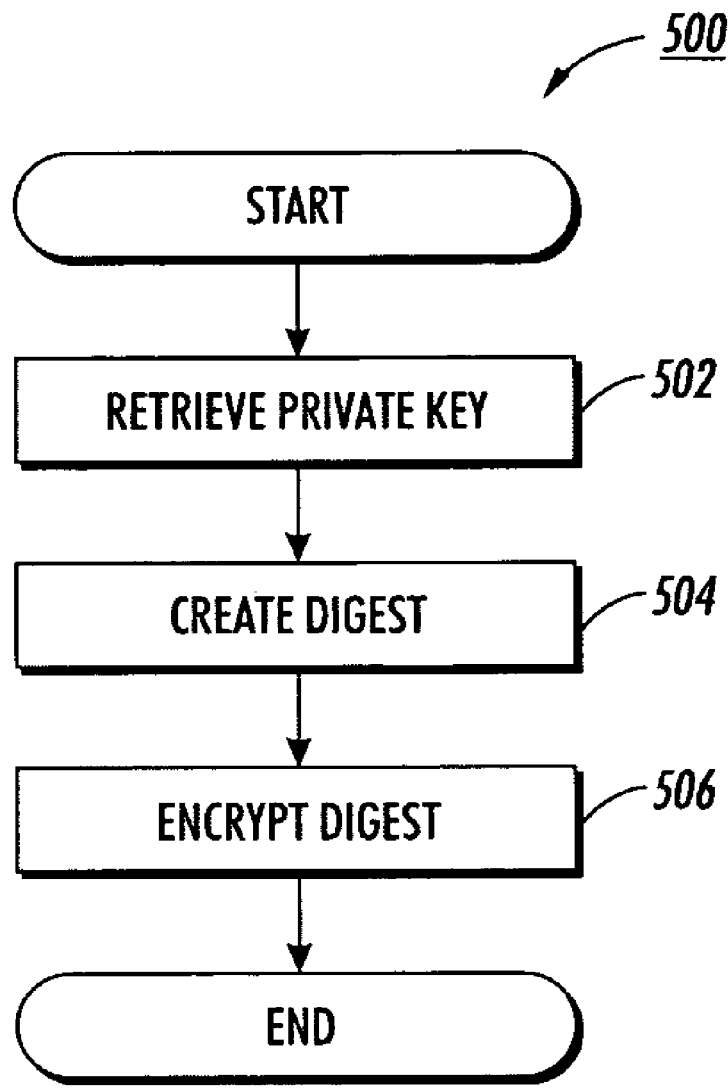
FIGS. 5 and 6 are flowcharts illustrating a method for creating and verifying a digital signature consistent with embodiments.

During the creation of seal 106, authentication data may be included in seal 106. For example, a digital signature may be included in seal 106. FIG. 5 is a flowchart illustrating a method 500 for creating a digital signature. Method 500 may be performed on system 300 by the creator of seal 106 utilizing computer 302. Also, method 500 may be performed by a third party such as a certifying authority. For example, the certifying authority may be located at any computer 310.

First, the creator retrieves the private key (stage 502). If computer 302 is being utilized, the private key may be stored on computer 302. In this case, the user may retrieve the key from memory. The creator may also create a new private/public key pair. The private key may also be stored remotely in another computer such as computer 310. In this case, the user may retrieve the private key via network 308.

The, the creator inputs either all or a portion of machine readable mark 102 or all or a portion of information 104 or combination of both into a transformation function to create a digest (stage 504). Any data may be transformed to create the digital signature, so long as the originally signed data is available to compare against the signature. The transformation function may be a standard hash function such as the Secure Hash Standard ("SHS") or FIPS 180.

Then, the user encrypts the digest by using a cryptographic algorithm to generate the digital signature using the private key (stage 506). For example, the cryptographic algorithm may be DSA or other asymmetric cryptographic algorithm. The digital signature would be included with seal 106.

After creation, the user attaches seal 106 to document 100 (stage 404). Seal 106 may be printed on document 100 utilizing computer 302 and printer 304. Seal 106 may also be printed on a label utilizing computer 302 and printer 304. Then, the label may be affixed to document 100.

After seal 106 has been attached to document 100, a user of the document may read seal 106 and classify document 100 using seal 106. The user of the seal 106 may be the creator of document 100. The user of seal 106 may also be another person who has received document 100.

The user reads seal 106 to determine the contents of seal 106 (stage 406). The user may read seal 106 by visually inspecting seal 106. The user may also input seal 106 into computer 302 using input device 306.

Then, using the information read from seal 106, the user may determine if data encoded in machine readable mark 102 appears elsewhere in document 100 in human readable form (stage 408). For example, if seal 200 is used as seal 106, the user would determine if data 202 is the English language word "YES." In this case, data encoded in machine readable mark 102 is contained in human readable information 104.

Alternatively, the user would determine if data 202 is the English language word "No." In this case, data 202 would indicate that data encoded in machine readable mark 102 is not contained in human readable information 104.

Next, the user may classify document 100 including machine readable mark 102 based on the determination (stage 410). Seal 106 may serve as a classification within the document production process that non-visible information encoded in machine readable mark 102 has not been inadvertently included on document 100. If seal 106 indicates that machine readable mark 102 contains data not included elsewhere in document 100, a user may classify document 100 as including sensitive data.

For example, if seal 200 is used, data 202 is the English language word "YES." In this case, data 202 would indicate that data encoded in machine readable mark 102 is contained in information 104 in document 100. As such, a user may classify document 100 as containing only information clearly readable.

Alternatively, data 202 may be the English language word "No." In this case, data 202 would indicate that data encoded in machine readable mark 102 is not contained in information 104 in document 100. As such, a user may classify document 100 as containing information not clearly readable.

Once classified, the user may make a decision about the use and disposition of document 100 (stage 412). The user may base the decision on whether machine readable mark 102 is encoded with data not visible in information 104. For example, if machine readable mark 102 is encoded with data not visible in information 104, the user may store document 100 in a safe location or destroy document 100. Otherwise, if machine readable mark 102 is encoded with data visible in information 104, the user may treat document 100 normally.

A user may also authenticate seal 106 or document 100 using authentication data included in seal 106 (stage 414). When authentication data 204 is verified, authentication data 204 attests that the origin of seal 106 is valid. That is a valid and trusted creator produced seal 106. Because the creator is trusted, the user may trust that the information in seal 106 is correct and trustworthy. As such, the user may trust that there is no sensitive data contained in machine readable mark 102 that is not readable in information 104. For example, a user the authentication data may be a digital signature.

Figure 6:
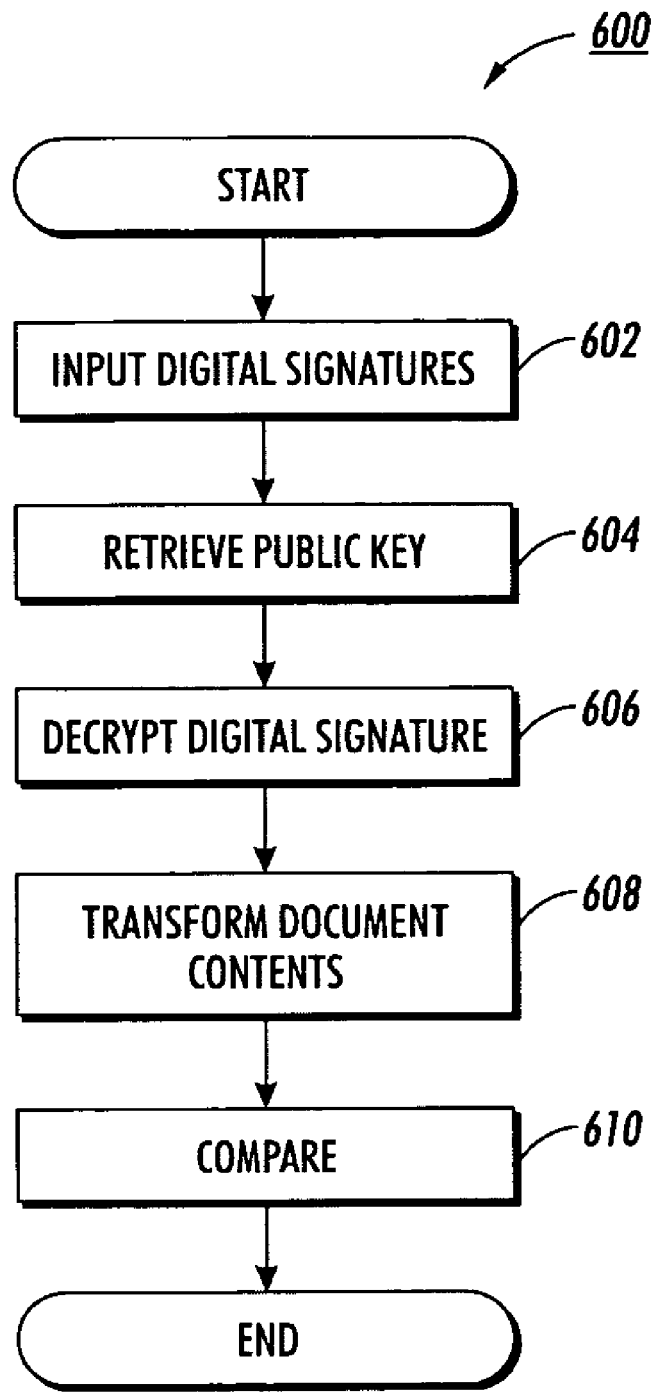

FIG. 6 is a flowchart illustrating a method 600 for authenticating a digital signature. Method 600 may be performed by a user using system 300. Also, method 600 may be performed by a third party such as a certifying authority. For example, the certifying authority may be located at any computer 310.

First, the user inputs the digital signature into computer 302 (stage 602). The digital signature may be input via input device 302, for example. The user may also manually type the digital signature via a device such as a keyboard.

Next, the user obtains the public key of the creator of document 100 (stage 604). The public key may be included in seal 106. In this case, user may input the public key into computer 302. The public key may be stored in computer 302. In this case, the user may retrieve the public key from memory. The public key may also be stored remotely in another computer such as computer 310. In this case, the user may retrieve the public key via network 308.

Next, the user decrypts the digital signature by using the retrieved public key (stage 606). The user applies the pubic key using the same cryptographic function used to create the digital signature. Computer 302 may perform the necessary processing to decrypt the digital signature.

Then, the user employs the same transformation function to recreate the digest (stage 608). The transformation function used will be the same function used to create the digital signature. Computer 302 may perform the necessary processing to transform the message.

Finally, the user compares the decrypted signature to the recreated digest (stage 610). Computer 302 may perform the necessary processing to the compare the signature to the digest. If the decrypted signature matches the recreated digest, the user knows that seal 106 is associated with document 100. Further, if the decrypted signature matches the recreated message digest, the user may also determine that document 100 is authentic.

In addition to the digital signature or alternatively to the digital signature, a user may verify the creator of seal 106 by comparing data encoded in machine readable mark 102 with human readable text in information 104 to verify that no sensitive data is contained in machine readable mark 102. For example, a user could input information 104 from document 100 into computer 302 using input device 306. If input device 306 includes an optical scanner, information 104 may be converted into digital data using optical character recognition (OCR).

Once information 104 has been input into computer 302, computer 302 may compare information 104 with data encoded in machine readable mark 102. Computer 302 would compare the data to determine if data encoded in machine readable mark 102 was contained in information 104. Machine readable mark 102 may be read using an input device 306 such as a laser scanner.

After comparison, computer 302 may return to the user a level of confidence that information encoded in machine readable mark 102 is readable in information 104. The level of confidence would represent the assuredness that data encoded in machine readable mark 102 was included in information 104. For example, computer 302 may return a percentage value level of confidence, e.g. 98% confidence.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of producing an attested document, said method comprising:
   reading encoded data in a document that is in a form other than human-readable form;
   determining an amount of content in the encoded data that appears in human-readable form in the document;
   determining a seal that attests to the amount of content in the encoded data that appears in human-readable form; and
   marking the document with the seal.

2. The method of claim 1, wherein determining the seal comprises:
   determining a digital signature for the document; and
   incorporating the digital signature into the seal.

3. The method of claim 2, wherein incorporating the digital signature comprises:
   encrypting the digital signature; and
   incorporating the encrypted digital signature into the seal.

4. The method of claim 1, further comprising:
   providing data in the document that indicates a certification authority that will authenticate the seal.

5. The method of claim 1, wherein marking the document with the seal comprises:
   determining an intended use for the document; and
   providing information in the seal that indicates the intended use.

6. The method of claim 1, wherein marking the document with the seal comprises:
   determining a manner of disposal for the document; and
   providing information in the seal that indicates the manner of disposal for the document.

7. A method of verifying a document, wherein the document contains encoded data that is in a form other than human-readable form, said method comprising:
   identifying a seal on the document, the seal comprising data about the encoded data on the document;
   reading the seal;
   determining a digital signature based on the document; and
   verifying that content in the encoded data appears in human-readable form on the document based on a comparison of the digital signature with the seal.

8. The method of claim 7, further comprising:
   authenticating the seal based on the digital signature.

9. The method of claim 7, further comprising:
   converting human readable data in the document into machine readable data; and
   authenticating the seal by verifying that content in the encoded data appears in human-readable form on the document based on a comparison of the encoded data and the converted human readable data.

10. The method of claim 7, further comprising determining a use for the document based on information in the seal.

11. The method of claim 7, further comprising determining a manner of disposal for the document based on information in the seal.

12. A system configured to produce attested documents, said system, comprising:
    at least one processor configured to read encoded data in a document that is in a form other than human-readable form, determine an amount of content in the encoded data that appears in human-readable form in the document, and determine a seal that attests to the amount of content in the encoded data that appears in human-readable form; and
    at least one printer that is configured to mark the document with the seal.

13. The system of claim 12, wherein the seal comprises a digital signature determined from the document.

14. The system of claim 13, wherein the at least one processor is configured to encrypt the digital signature and incorporate the encrypted digital signature into the seal.

15. The system of claim 13, wherein the at least one processor is configured to determine an intended use for the document based on reading the seal and handle the document based on the intended use.

16. The system of claim 12, wherein the at least one processor is configured to determine when all content of the encoded data appears in human-form on the document.

17. The system of claim 12, wherein the at least one processor is configured to determine a manner of disposal for the document based on reading the seal and dispose of the document based on the determined manner.

18. The system of claim 12, wherein the at least one processor is configured to authenticate the seal based on the digital signature.

19. The system of claim 12, wherein the at least one printer is configured to print the seal on a medium that can be attached to the document.

* * * * *